United States Patent [19]

Agarwal et al.

[11] Patent Number: 5,751,619
[45] Date of Patent: May 12, 1998

[54] RECURRENT ADRITHMETICAL COMPUTATION USING CARRY-SAVE ARITHMETIC

[75] Inventors: Ramesh Chandra Agarwal, Yorktown Heights; Bruce Martin Fleischer, Mt. Kisco; Fred Gehrung Gustavson, Briarcliff Manor, all of N.Y.

[73] Assignee: International Business Machines Corporation, Armonk, N.Y.

[21] Appl. No.: 589,770

[22] Filed: Jan. 22, 1996

[51] Int. Cl.$^6$ .............................. G06F 7/38; G06F 7/52
[52] U.S. Cl. ........................ 364/736.02; 364/760.02
[58] Field of Search ........................ 364/736, 754, 364/757, 758, 759, 760, 752, 753, 765

[56] References Cited

U.S. PATENT DOCUMENTS

| | | | |
|---|---|---|---|
| 4,546,446 | 10/1985 | Machida | 364/759 |
| 4,556,948 | 12/1985 | Mercy | 364/757 |
| 4,575,812 | 3/1986 | Klocker et al. | 364/760 |
| 4,868,770 | 9/1989 | Nishiyama et al. | 364/754 |
| 4,958,312 | 9/1990 | Ang et al. | 364/754 |
| 4,970,676 | 11/1990 | Flling | 364/759 |
| 5,025,408 | 6/1991 | Sherman | 364/759 |
| 5,153,849 | 10/1992 | Venzl et al. | 364/754 |
| 5,253,195 | 10/1993 | Broker et al. | 364/759 |
| 5,265,043 | 11/1993 | Naini et al. | 364/757 |
| 5,280,439 | 1/1994 | Quek et al. | 364/760 |

OTHER PUBLICATIONS

Chai, et al., "A 120 MFlops CMOS Floating–Point Processor", IEEE 1991 Custom Integrated Circuits Conference, pp. 15.1.1–15.1.4.

Lyu, et al., "Redundant Binary Booth Recoding", IEEE, 1995, pp. 50–57.

*Primary Examiner*—Chuong Dinh Ngo
*Attorney, Agent, or Firm*—Whitham, Curtis & Whitham; Stephen C. Kaufman

[57] ABSTRACT

An arithmetic unit keeps a result in carry-save form and uses this form of the result as an input to the next iteration in recurrent computations. The full adder in the recurrent path is eliminated by implementing multiplication by Y(i), where Y(i) is available only in carry-save form. The carry-save arithmetic unit generates a plurality of partial products whose sum is the product A×B, where A is one binary input and B is either a second binary input B' or the sum C'+S' of two binary inputs C' and S'. A selection is made as to whether B is equal to B' or C'+S'. The plurality of partial products and an addition input Z are compressed to two partial products C and S whose sum C+S equals the sum of the plurality of partial products and Z. The partial products C and S are added to produce a binary result X equal to A×B+Z. The full adder in the recurrent path is eliminated by a feedback path which returns the partial products C and S to the inputs C' and S' for a next iteration.

5 Claims, 9 Drawing Sheets

RECURRENT ADRITHMETICAL COMPUTATION USING CARRY-SAVE ARITHMETIC

DESCRIPTION

BACKGROUND OF THE INVENTION

1. Field of the Invention

The present invention generally relates to arithmetic units for digital processors, either special purpose (e.g., digital signal processors (DSPs)) or general purpose (e.g., microprocessors), and, more particularly, to multipliers using carry-save arithmetic which facilitates fast recurrent computations, including digital filters and recurrent mantissa calculations in floating point units, such as are used for division and square-root operations.

2. Background Description

Recurrent computations are widely used in many engineering and scientific problems. One of the most common arithmetic constructs is mantissa calculations for floating-point division and square-root and high radix division algorithms. See Donald E. Knuth, *The Art of Computer Programming*, Vol. 2, Seminumerical Algorithms, 2nd Ed., Addison Wesley (1981), pp. 255–260. As an example, consider the following recurrent computation:

$$Y(t)=A(t)\times Y(t-1)+Z(t).$$

In a typical hardware implementation, the multiplication in the above computation is usually implemented as a carry-save arithmetic (CSA) tree. Assuming that Y(t) is truncated to an n-bit number, this CSA tree has n binary input vectors which are reduced to two binary vectors; i.e., a carry vector and a sum vector. This is referred to as an n:2 CSA reduction. This CSA tree is usually implemented as a nested tree consisting of 3:2 or 4:2 reduction stages, or some variation of this. The total delay in the CSA tree is roughly proportional to log(n).

In a conventional arithmetic implementation, the last two binary vectors and Z, properly aligned, are added in a full adder (i.e., a carry-propagate adder) to produce the desired number of bits of Y(t). The additional delay of the full adder is also roughly proportional to log(n). The total delay (or cycle time) of the recurrent path is approximately the sum of delays in the CSA tree and in the full adder. Thus, the delay due to the full adder is a substantial fraction of the total cycle time. In modern digital processors, there is a continuing effort to reduce cycle times of arithmetic units in order to improve the overall performance of the processors.

U.S. Pat. No. 5,280,439 to Quek et al. discloses an apparatus for computing Booth recoder input control signals. The Booth recoder input control signals comprise the corrective carry output and the sum output bits, the corrective carry outut being supplied as a Booth recoding overlap bit input.

Paul Chai et al. in "A 120 MFLOPS CMOS FLOATING-POINT PROCESSOR", IEEE 1991 Custom Integrated Circuits Conference, pp. 15.1.1–15.1.4, describe a floating-point arithmetic logic unit (ALU) that implements a modified Booth recoder that can accept its inputs in redundant form. As a result, the output of the multiplier array can be used in the next cycle without having to waste a cycle converting the output into non-redundant binary form.

Chang Nan Lyu and David Matula in "Redundant Binary Booth Recoding", *Proc. of IEEE* 12 *Symp. Comput. Arith.*, 1995, pp. 50–57, report on their investigation of efficiencies attainable by pursuing recoding directly from redundant binary input with limited carry propagation.

While Booth recoding of carry-save input is generally known, as indicated by the cited prior art, the prior art requires that the above recurrent computation be performed in two steps; i.e., recoding of the multiplication by the beedback term, and the addition of Z. Also, the prior art treats the recoding as a single step, following the selection of carry-save (feedback) or binary inputs, so that the delay for recoding binary inputs includes all of the additional logic required by the redundant binary inputs.

SUMMARY OF THE INVENTION

It is therefore an object of the present invention to provide an arithmetic unit for a digital processor that minimizes the delay in carrying out a recurrent computation, where a next result depends on a product involving a previous result.

According to the invention, there is provided an arithmetic unit which keeps the result in carry-save form and uses this form of the result as an input to the next iteration. The full adder in the recurrent path is eliminated by implementing multiplication by Y(i), where Y(i) is available only in carry-save form. The carry-save arithmetic unit generates a plurality of partial products whose sum is the product A×B, where A is one binary input and B is either a second binary input B' or the sum C'+S' of two binary inputs C' and S'. A selection is made as to whether B is equal to B' or C'+S'. The plurality of partial products and an additional input Z are compressed to two partial products C and S whose sum C+S equals the sum of the plurality of partial products and Z. The partial products C and S are added to produce a binary result X equal to A×B+Z. The full adder in the recurrent path is eliminated by a feedback path which returns the partial products C and S to the inputs C' and S' for a next iteration.

An important feature of the invention is that Z is provided as an input to the compressor array. If Z has the same scale as Y, it can be worked into the compressor array at a fixed alignment, with little impact. Such is the case for fixed-point calculations (i.e., integers or fractions of known scale) or for mantissa calculations in floating-point units.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
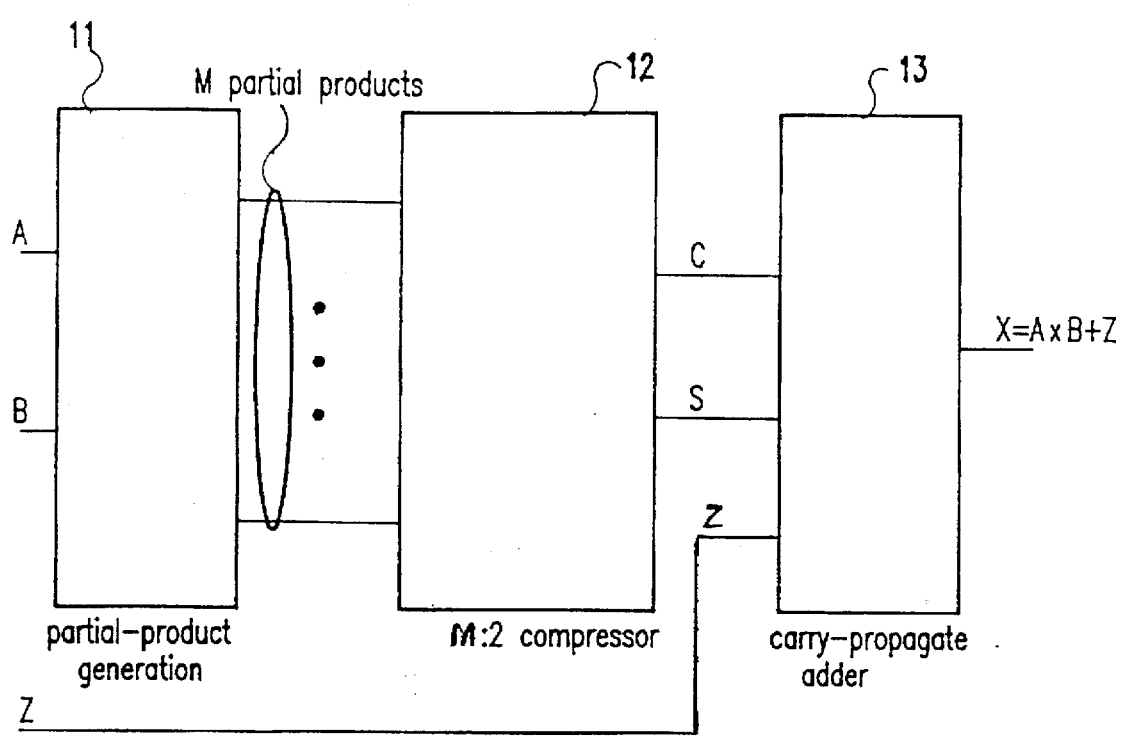
FIG. 1 is a block diagram of a conventional multiplier-add implemented as a carry-save arithmetic tree.

Referring now to the drawings, and more particularly to FIG. 1, there is shown in block diagram form an example of a conventional multiplier. The discussion here is presented in terms of n-bit binary integers. For example, B[n−1] B[n−2] ... B[0] represents the value $$B = \sum_{i=0}^{n-1} 2^i B[i]. \tag{1}$$

With scaling, the calculations and methods given apply to general fixed-point numbers (integers or fractions of known scale).

In the current art, a fast multiply-add circuit to calculate X=A×B+Z has the structure generally shown in FIG. 1. The inputs A and B are input to partial product generator 11 which generates a number of (say M) partial products, whose sum is A×B. The sum of these partial products is reduced to two terms, carry (C) and sum (S), by the M:2 compressor array 12. The third input, Z, is input to an alignment register 14. A binary adder 13 then calculates X=C+S+Z=A×B+Z. The design of both compressor arrays and binary adders are well understood in the art. Designs are well known to those skilled in the art to perform both compression and addition in time proportional to log(n) where n is the number of partial products or the number of bits involved. The delay for a complete multiplication is therefore approximately 2log(n) logic stages.

The simplest approach to generating partial products is analogous to longhand multiplication:

$$A \times B = A \sum_{i=0}^{n-1} 2^i B[i], \tag{2}$$

$$A \times B = \sum_{i=0}^{n-1} A \times B[i] 2^i, \tag{3}$$

$$A \times B = \sum_{i=0}^{n-1} PP(i), \tag{4}$$

where PP(i), the i-th partial product, is $0$ if B[i]=0, and is A shifted left by i bits if B[i]=1. This approach generates n partial products (one for each bit in B) and requires an n:2 compressor array for multiplication, or an n+1:2 compressor array for multiply-add.

The current art in partial-product generation uses work by A. D. Booth, "A signed binary multiplication technique", *Quarterly Journal of Mech. Appl. Math.*, 4, part 2 (1951), and O. L. MacSorley, "High Speed Arithmetic in Binary Computers", *Proceedings of the IRE*, Vol. 49, January 1961, pp. 67–71, known as modified Booth recoding, to perform multiplication with only n/2 partial products, one for each pair of bits in B. To understand this technique, let P[i]=2× B[2i+1]+B[2i] represent the value (between 0 and 3) of the i-th pair of bits in B. Equation (1) can then be rewritten as follows:

$$B = \sum_{i=0}^{\frac{n}{2}-1} 2^{2i} P[i]. \tag{5}$$

In modified Booth recoding, the values P'[i] are calculated from Table 1.

TABLE 1

MODIFIED BOOTH RECODING

| P[i] | P'[i] if P[i − 1] < 2 | P'[i] if P[i − 1] > 1 |
|------|----------------------|----------------------|
| 0    | 0                    | 1                    |
| 1    | 1                    | 2                    |
| 2    | −2                   | −1                   |
| 3    | −1                   | 0                    |

The condition P[i−1]>1 is true when B[2i−1]=1. The encoded values, P'[i], therefore, depends on overlapping triplets (B[2i−1], B[2i], B[2i+1]) of bits of B. The values P'[i] represent B in the same way as did P[i], since $$B = \sum_{i=0}^{\frac{n}{2}-1} 2^{2i} P'[i]. \tag{6}$$

To see that this last equation holds, note that we can also generate P'[i] by the following procedure, which will come in handy later:

For each i, let P'[i]=P[i].

For each i, if P[i]>1, decrease P'[i] by 4 and increase P'[i+1] (worth 4 times as much) by 1.

In summary, the representation of B is transformed as follows:

| | B[n − 1] B[n − 2] ... lB[3] B[2] | | B[1] B[0] | | B[i] = 0 or 1 |
| | group bit-pairs | | | | |
| | P[(n/2) − 1]   l...lP[1] | | P[0] | | P[i] = 0, 1, 2, or 3 |
| | modified Booth recoding | | | | |
| | P'[(n/2) − 1]   l...lP'[1] | | P'[0] | | P'[i] = −2, −1, 0, 1, or 2 |

The encoded values P'[i] can then be used to express A×B as the sum of n/2 partial products:

$$A \times B = \sum_{i=0}^{\frac{n}{2}-1} A \times P'[i] 2^{2i}. \tag{7}$$

Because each P'[i] is between −2 and 2, each of the partial products in Equation (7) is either 0 or a power of 2 times either A or −A. Each partial product can therefore be generated by selecting either 0 or an appropriately shifted copy of A or −A.

Figure 2:
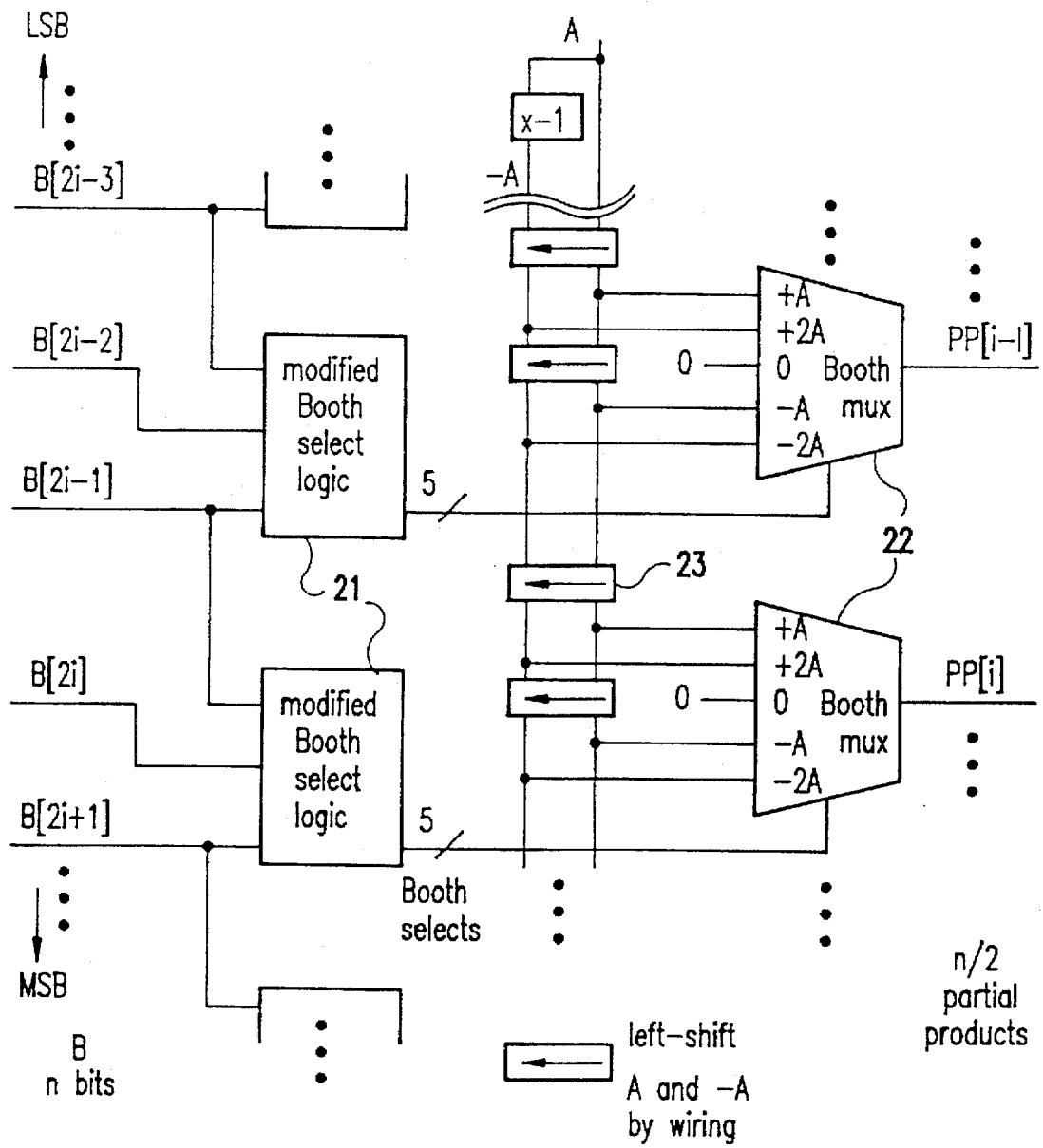
FIG. 2 is block diagram illustrating conventional modified Booth recoding.

Typical embodiments of partial product generation through modified Booth recoding are similar to FIG. 2. B is input to the modified Booth encoder array 21, and A is input to the array of "Booth multiplexers" 22. The left shifting of A and −A is done simply by wire routing 23. Selection of partial products is done by the 5-port "Booth multiplexers" 22 at the compressor array inputs. The select signals for the multiplexers, or "Booth selects", are 1-of-5 code representations of the encoded values P'[i] output by the modified Booth encoders. The logic to produce the Booth selects from the appropriate bits of B is described by Table 1, above.

The biggest difference between adding n partial products as in Equation (3) and n/2 partial products as in Equation (7) is that the area of the compressor array is approximately halved. The delay remains approximately log(n); that is, a reduction of one to two stages of the compressor array is partially offset by the delay of the recoding logic.

Consider the recurrence computation $$Y(t)=A(t) \times Y(t-1)+Z(t), \qquad (8)$$

where the index (t) indicates the value during the t-th iteration, the inputs are Y(0), A(t) and Z(t), for t=1,2, . . . , R, and the output after the R-th iteration is Y(R).

Figure 3:
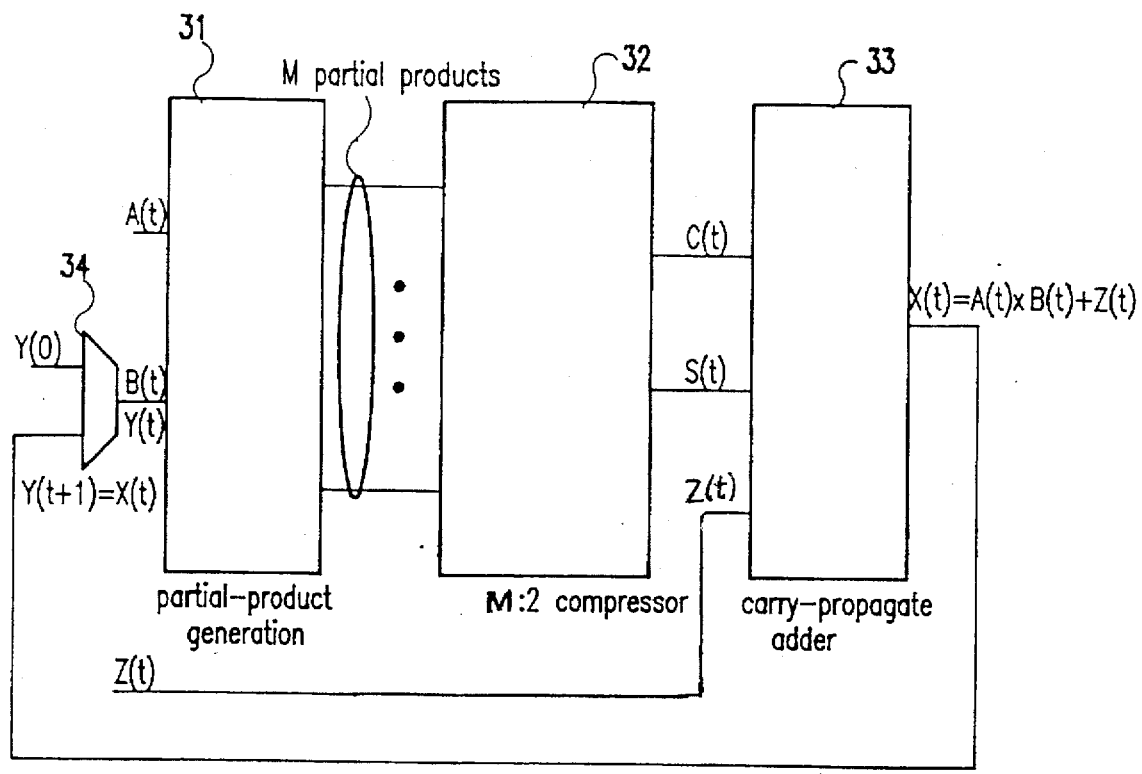
FIG. 3 is a block diagram showing conventional recurrence data flow.

This calculation could be performed, using the current art, by the data flow in FIG. 3. The inputs A(t) and B(t) are input to partial product generator 31 which generates M partial products. The sum of these partial products is reduced to two terms, C(t) and S(t), by the M:2 compressor array 32. The third input, Z(t), is input to an alignment register 35. A binary adder 33 then calculates X(t)=A(t)×B(t)+Z(t). This output is fed back to a selector 34. The control logic for the selector 34 enables the input labeled Y(0) for non-recurrent calculations or the first step of a recurrent calculation, and enables the feedback input for subsequent steps of a recurrent calculation. The compressor array 32 also has Z as an input. If Z has the same scale as Y, it can be worked into the compressor array at a fixed alignment, with little impact. Such is the case for fixed-point calculations (i.e., integers or fractions of known scale) or for mantissa calculations in floating-point units. The situation would be much different if Z were to be an arbitrary floating-point number. Prenormalization would be required to align Z with other partial products, and any stages including Z would have to have considerably more bits than the width of the multiplier alone. Finally, because the scale of the result of each iteration would not be known beforehand and could be greatly affected by Z(t), normalization would have to be included in each iteration. A good discussion of a full floating-point multiply-add unit is provided by Montoye, Hokenek and Runyon, "Design of the IBM RISC System/6000 floating-point execution unit", *IBM J. Res. Develop.*, Vol. 34, No. 1, January 1990, pp. 59–70.

For simplicity, FIG. 3 omits a register which must be present somewhere in the feedback path to partial product generation, to hold the data from one iteration to the next. This approach uses the multiplier shown in FIG. 1, where B(t)=Y(t) and Y(t+1)=X(t). The time required to calculate Y(R) by this method would be approximately 2Rlog(n).

Figure 4:
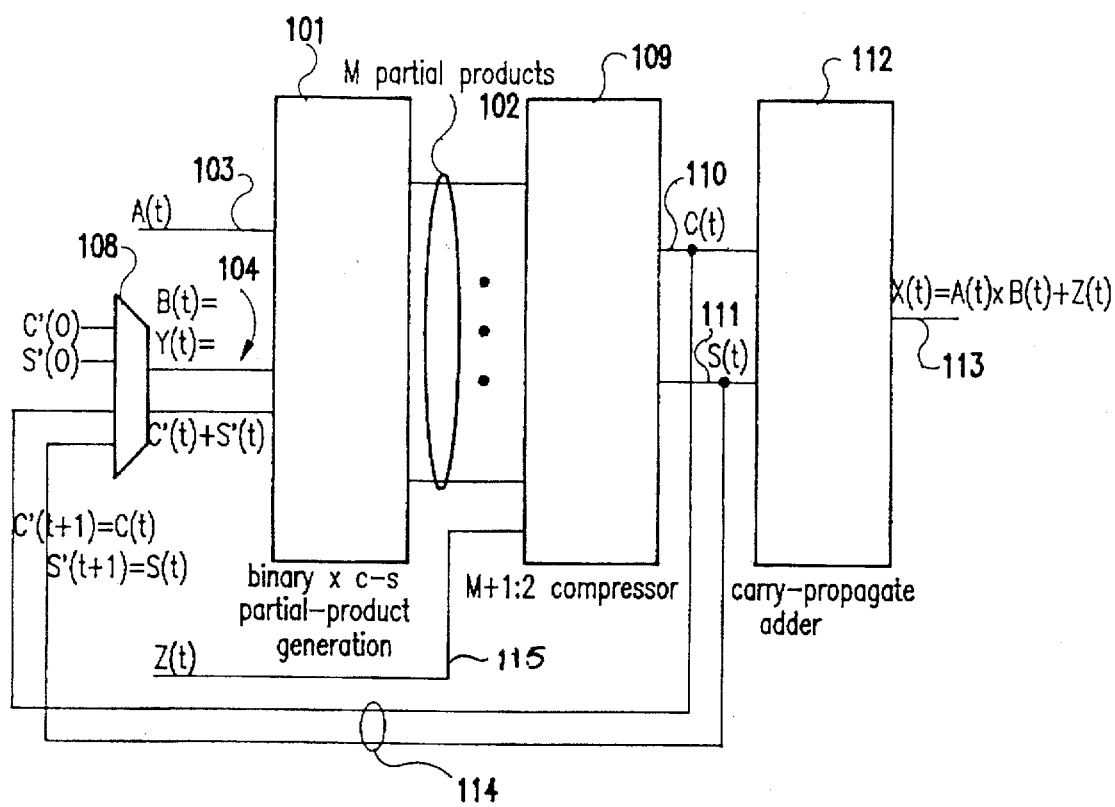
FIG. 4 is a block diagram showing recurrence data flow according to the present invention.

The present invention, illustrated in FIG. 4, allows the calculation of the recurrent Equation (8) in time approximately (R+1)log(n), or about half the time needed with the method implemented in FIG. 3. The key is to cut the time for each iteration in half by closing the loop after compressing the partial products to two terms (carry-save form) and only performing the final carry-propagate addition when the result is to be output. A partial product generator 101 generates a plurality of partial products 102 whose sum is the product A×B, where A is one binary input 103 and B, the other binary input 104, is the output of selector 108. The partial products 102 and the third input 115, Z(t), are input to an M+1:2 compressor 109, which generates the carry-save outputs 110 and 111, C(t) and S(t). The carry-save outputs 110 and 111 are supplied to final adder 112, which generates the output 113, X(t), and also fedback via connection 114. The selector 108, with appropriate control logic, chooses the carry-save input to the partial-product generator 101 to be the input Y(0)=C(0)+S(0), on the initial iteration, and the feedback term, C(t)+S(t), via connection 114 on subsequent iterations. Because the feedback term is in carry-save form, the partial-product generator 101 must accept one binary input and one carry-save input. The partial-product generator will be discussed in more detail below. If the initial value Y(0) is available in binary form, it can be provided as S(0), with C(0)=0. The M+1:2 compressor 109 and the final adder 112 can be conventional.

The embodiments below address only the generation of the partial products. Compression and final addition is performed conventionally. In the first embodiment, generation of n partial products, where n is the number of bits in B, is performed using the structure generally shown in FIG. 5. Partial product generation is implemented as a carry sum arithmetic (CSA) tree. In the example shown, an 8-bit number A is multiplied by an 8-bit number B in an array of carry/save adders 201 to 207. A carry-save adder is simply n independent full adders. The carry and sum outputs from carry-save adder 207 has two output bit streams c(k), corresponding to carry bits, and s(k), corresponding to sum bits. These two bit streams collectively represent the output Y. Without loss of generality, we can shift one of the streams by one position so that for the same value of k, bits in c(k) and s(k) streams have identical place values. Instead of feeding these bit streams to a carry propagate adder, as in the prior art, we feed these bit streams to block 200, shown in more detail in FIG. 6. The delay due to a carry propagate adder is a substantial fraction of the total cycle time, and when the multiplier is used for recurrent computations such as division, this delay greatly increases the time of the computation since the delay is cumulative with each iteration.

In the present invention, the full adder is eliminated from the recurrent path by implementing multiplication by Y(t), where Y(t) is available only in carry-save form. To simplify notations, consider multiplications of two numbers a×b, where a is an m-bit number in fully reduced form and represented by m binary bits as a(j), j=0,1, . . . , m−1, and b is an n-bit number represented by the sum of two numbers c and s, each one of these being represented by n binary bits c(k) and s(k), k=0,1, . . . ,n−1. Then, $$a=(a(0) \times 2^0+a(1) \times 2^1+ \ldots +a(m-1) \times 2^{m-1}$$

$$b=((c(0)+s(0)) \times 2^0+((c(1)+s(1)) \times 2^1+ \ldots +(c(n-1)+s(n-1)) \times 2^{n-1}$$

In computer arithmetic, a multiplication is implemented as addition of n binary numbers (or rows), the k-th row is shifted left by k positions, corresponding to multiplication by $2^k$. Depending on the k-th bit of the multiplier being a "0" or "1", the k-th row either has a string of all zeros or it has the binary sequence of a. This is achieved by gating the binary string of a with b(k).

Figure 5:
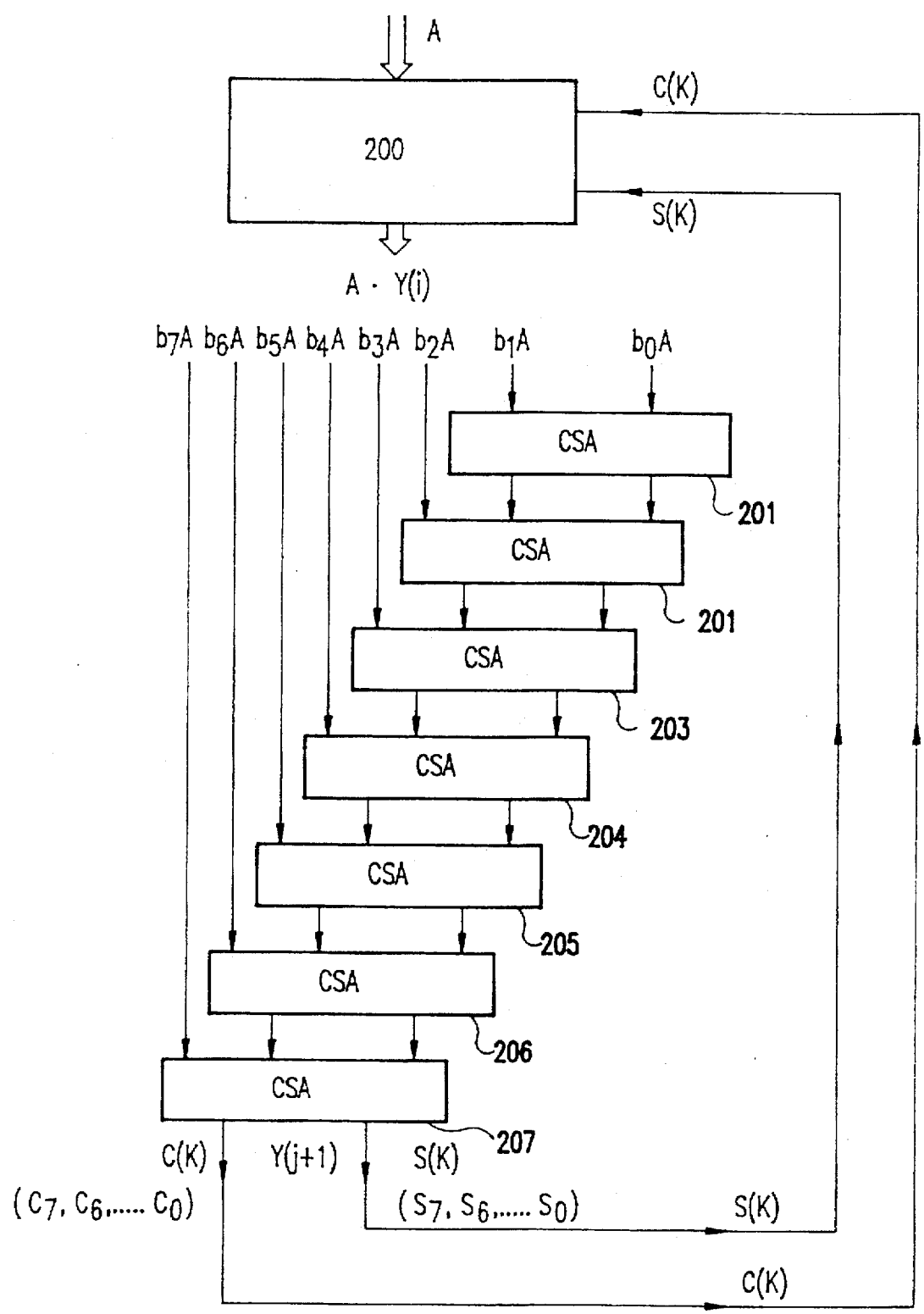
FIG. 5 is a block diagram showing the partial product generator according to a first embodiment of the invention.

Referring again to FIG. 5, note that the bit streams c(k) and s(k) collectively represent the output Y. Let b(k)=c(k)+s(k). Depending on the values of c(k) and s(k), b(k) can take on values 0, 1 or 2. The rows which are fed to the CSA tree in FIG. 5 are represented by b(k)×A$2^k$. To account for scaling by $2^k$, each successive row in the CSA tree is shifted left by one position. When b(k) takes values 0 and 1, the processing in FIG. 5 proceeds normally, but when b(k) is 2, then the A sequence is shifted left by one position. This is shown in FIG. 6.

Figure 6:
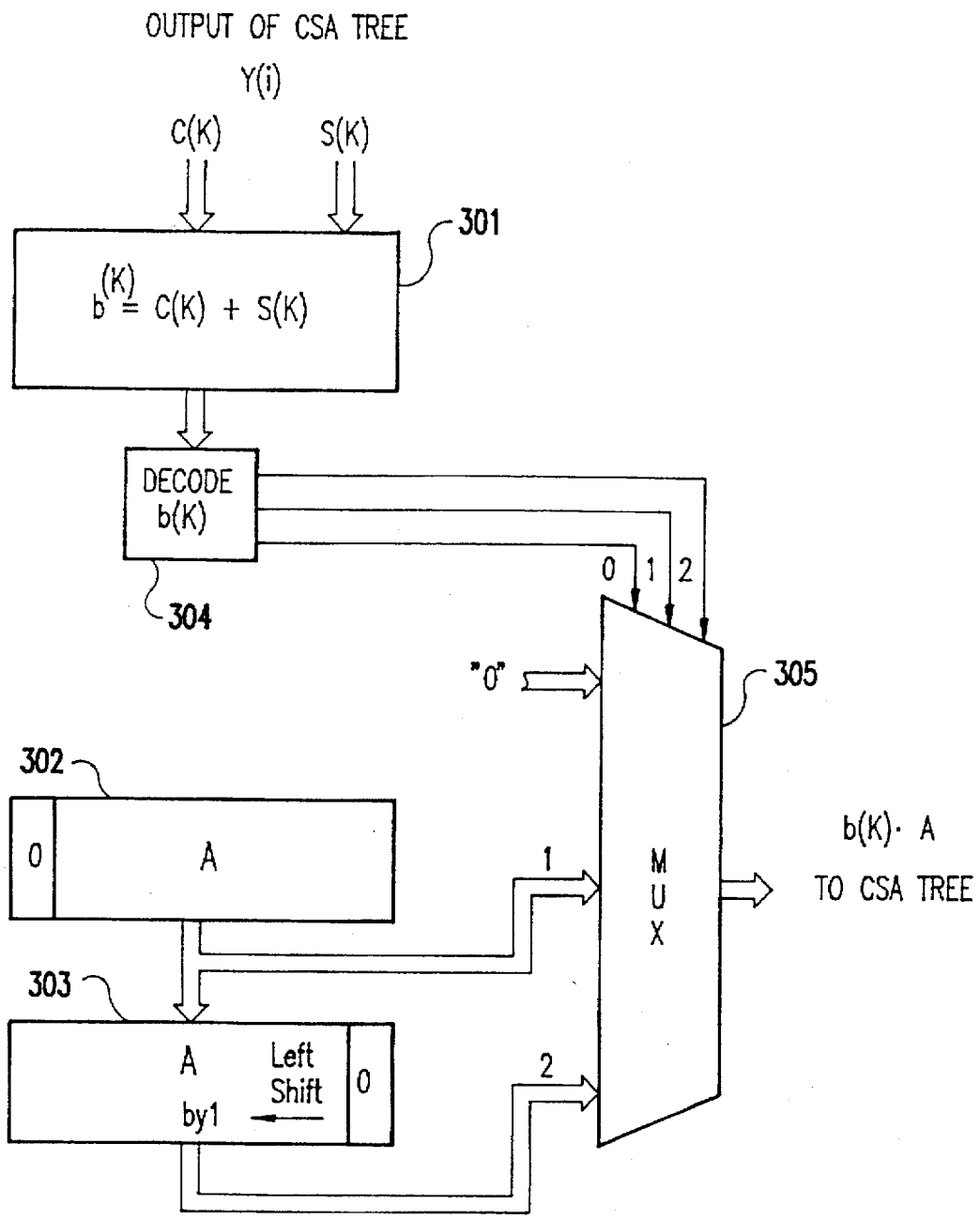
FIG. 6 is a block diagram showing in more detail a part of the logic of the partial product generator of FIG. 5.

In FIG. 6, the multiplicand, a, is loaded in register 301, and the multiplier, b, is loaded in register 302. The multiplier is in carry-save form, here represented as c(k)+s(k), meaning that it is a double n-bit register. To facilitate faster operation, the multiplicand, a, is also loaded into an m+1-bit register 303 and shifted one bit to the left, thus multiplying a by 2. Now, each row of b is accessed in turn and supplied to a decoder 304 to determine whether the sum of c(k)+s(k) is 0, 1 or 2. Simple AND/OR gate logic is used for the decoder. The outputs are the selection signals for a multiplexer 305. If the selection signal 0 is active, the multiplexer 305 outputs a string of zeros to the CSA tree. If the selection signal 1 is active, the multiplexer 305 outputs the original binary sequence a from register 302 to the CSA tree. If the selection signal 2 is active, the multiplexer 305 outputs the shifted sequence a from register 303 to the CSA tree.

To allow for the left shift of the bit stream of A without overflowing, we append a zero to the left of A (i.e., in the highest order bit position). Depending on the value of b(k) (0, 1 or 2), the multiplexer 305 selects a string of 0s, A or 2A (i.e., bit stream of A shifted left by one position). The additional delay due to b(k) decoding and the multiplexer is very small compared to the delay in the carry propagate adder in the conventional multiplier. This significantly reduces the cycle time in the recurrent path with very little additional hardware.

As discussed earlier, the current art allows multiplication of n-bit binary numbers by adding only n/2 partial products using modified Booth recoding of the input B. Such multipliers are generally preferred to those that generate n partial products because of their smaller area. The "bitstack" circuits in such a multiplier, consisting of a the copying and shifting of A and −A, the Booth multiplexors, and the compressor array, occupy a significant fraction of the total area of a multiplier, and their design involves a significant effort.

A second embodiment of the invention allows the calculation of the recurrent Equation (8) in time approximately (R+1)log(n), using the same bitstack circuits as a conventional multiplier with modified Booth recoding. This second embodiment differs by the addition of carry-save feedback, the means for selecting the feedback or initialization term as one multiplier input, and the encoding of Booth select signals from a carry-save input.

Booth recoding of carry-save inputs is know in the current art, generically, and described in the cited prior art specifically. Booth recoding of carry-save inputs in the present invention differs from the prior art in that the redundant input is first compressed, with one level of limited carry propagation, to a form which may be multiplexed with ordinary binary inputs, and from which the recoding can be completed with logic that is minimally greater than that for recoding ordinary binary inputs. The two-step recoding of carry-save inputs, as practiced in this invention, is described below.

First, note that the procedure for modified Booth recoding given after Equation (6) can be applied to bit-pair values P[i] greater than 3 and can be used to extend Table 1 to P[i] in the range of 0 to 5.

TABLE 2

EXTENDED MODIFIED BOOTH RECODING

| P[i] | P'[i] if P[i − 1] < 2 | P'[i] if P[i − 1] > 1 |
|------|------------------------|------------------------|
| 0    | 0                      | 1                      |
| 1    | 1                      | 2                      |
| 2    | −2                     | −1                     |
| 3    | −1                     | 0                      |
| 4    | 0                      | 1                      |
| 5    | 1                      | 2                      |

The "extended modified Booth recoding" given by Table 2 still gives encoded bit-pair values P'[i] between −2 and 2 and still satisfies Equation (6). Therefore, if we can just get the maximum value of a bit-pair down from 6 to 5, we could generate Booth selects that would work with the same bitstack circuits as used with Booth-encoded single binary input.

Figure 7:
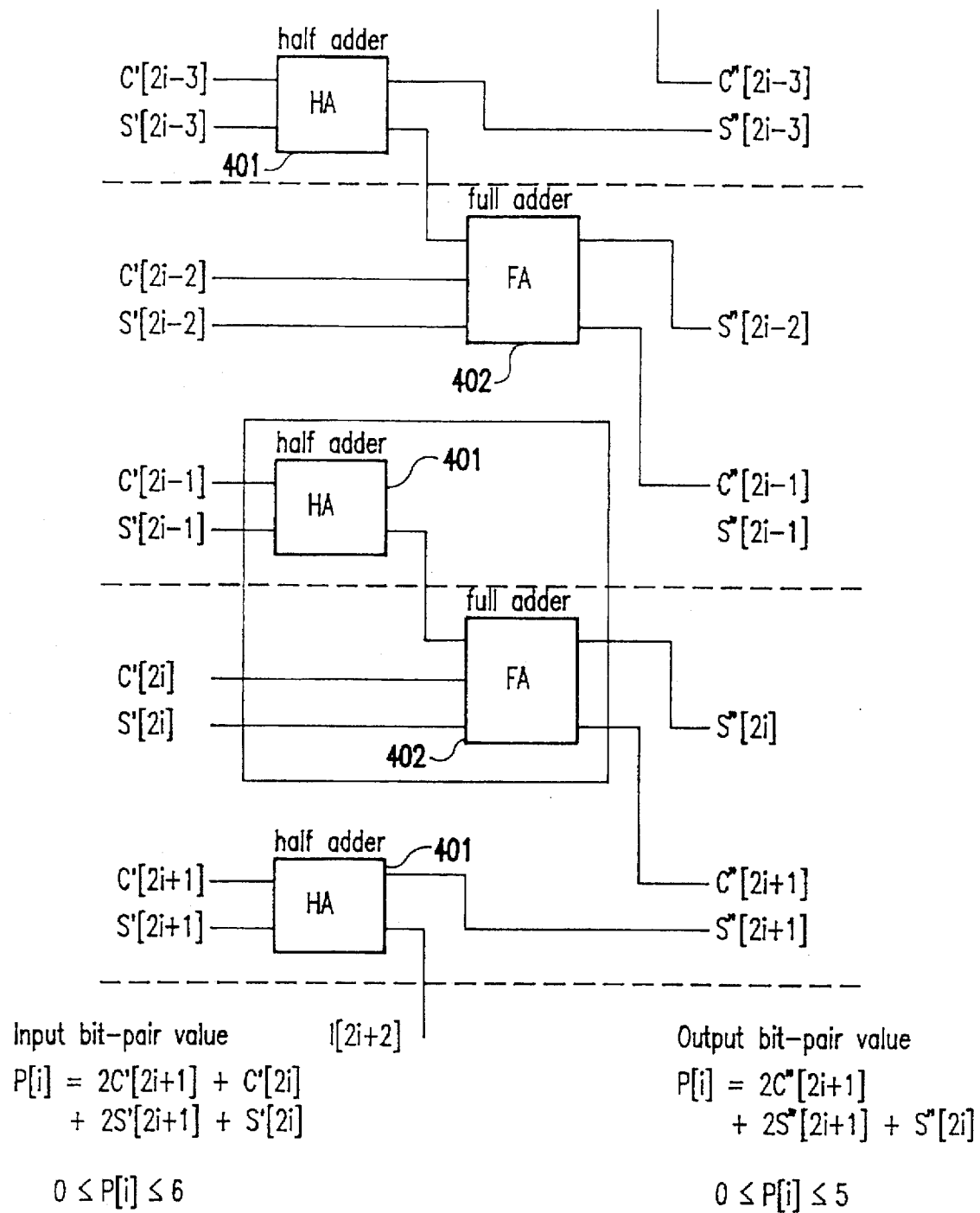
FIG. 7 is a block diagram of the compression logic used in second embodiment of the invention.

Second, perform one additional stage of compression on C' and S', as in FIG. 7, to produce C" and S", where C"[i] is non-zero (i.e., is physically implemented) only for odd values of i. The sum of the two partial products is not changed by this compression:

$$C''+S''=C'+S'. \quad (10)$$

The compression logic of FIG. 7 comprises an array of half adders 401 receiving bit pairs followed by an array of full adders 402, the combination generating partial products. We can verify that the outputs of each block in FIG. 7 have the same total value as the inputs. The half adder outputs are S"[2i−1] and an intermediate carry I[2i], used by the full adder:

$$2I[2i]+S''[2i-1]=S'[2i-1]+C'[2i-1] \quad (11)$$

$$4C''[2i+1]+2S''[2i]=2S'[2i]+2C'[2i]+C'[2i-1] \quad (12)$$

Combining Equations (11) and (12), $$4C''[2i+1]+2S''[2i]+S''[2i-1]=2S'[2i]+2C'[2i]+S'[2i-1]+C'[2i-1]. \quad (13)$$

Summing Equation (13) over all blocks, with appropriate powers of 2 and modifications in the most and least-significant bits, we get $$\sum_{i=1}^{n} 2^i C''[i] + \sum_{i=1}^{n} 2^i S''[i] = \sum_{i=1}^{n} 2^i C'[i] + \sum_{i=1}^{n} 2^i S' \quad (14)$$

which is equivalent to Equation (10). We can now assign a value to each "bit-pair" of C" and S" (really 2 bits of S" and 1 bit of C"):

$$P[i]=2\times C''[2i+1]+2\times S''[2i+1]+[2i]. \quad (15)$$

These values of P[i] can be encoded by Table 2, where the test P[i−1]>1 is true when C"[2i−1]=1 or S"[2i−1]=1. The resulting P'[i] are used to select partial products exactly as before, given by Equation (7).

Figure 8:
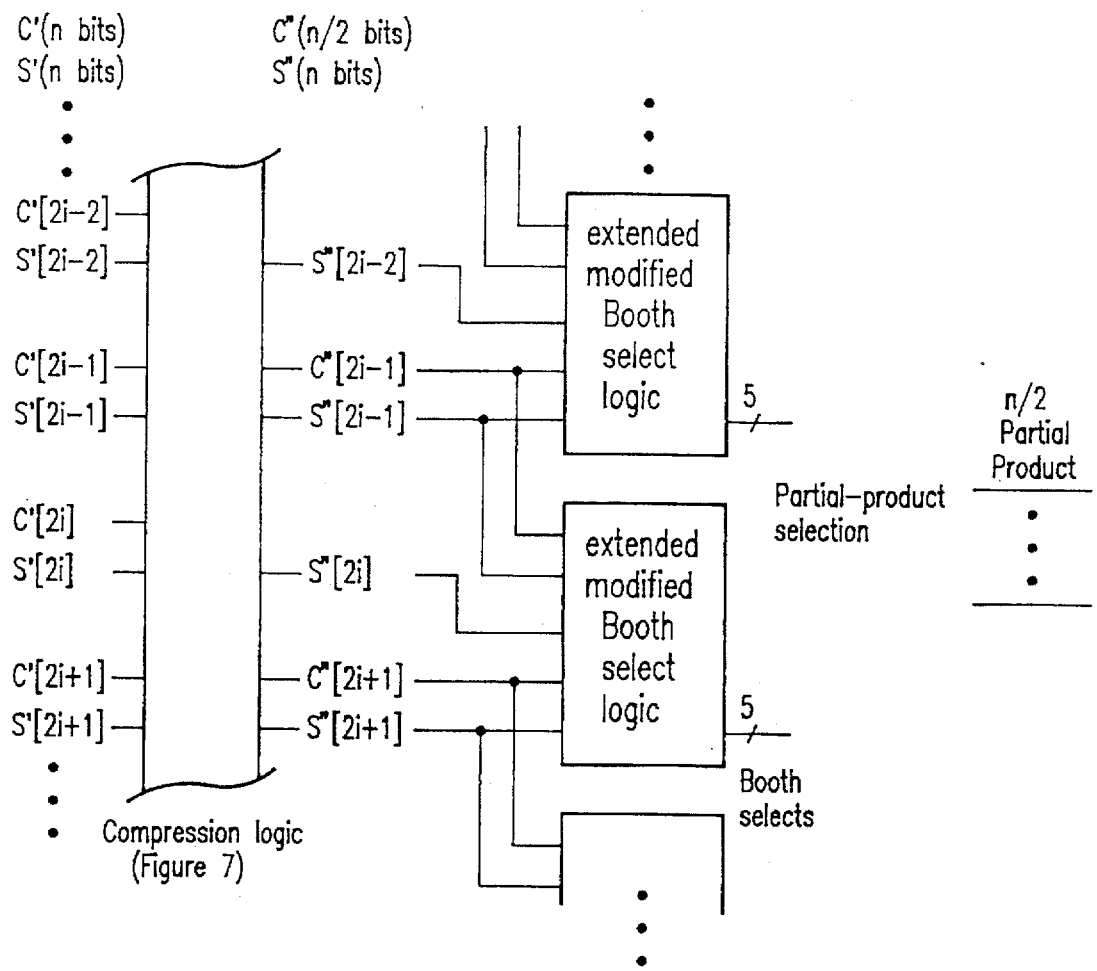
FIG. 8 is a block diagram of the generation of partial products according to the second embodiment of the invention.

In the second embodiment of the invention, the partial-product generation shown in FIG. 4 is implemented as shown in FIG. 8. An additional compression, described above and illustrated in FIG. 7, converts the 2n bits of the carry-save input to n+n/2 bits. Extended modified Booth recoding, described in Table 2, generates n/2 sets of Booth select signals, after which shifting and selection of the n/2 partial products proceeds as in the prior art.

Figure 9:
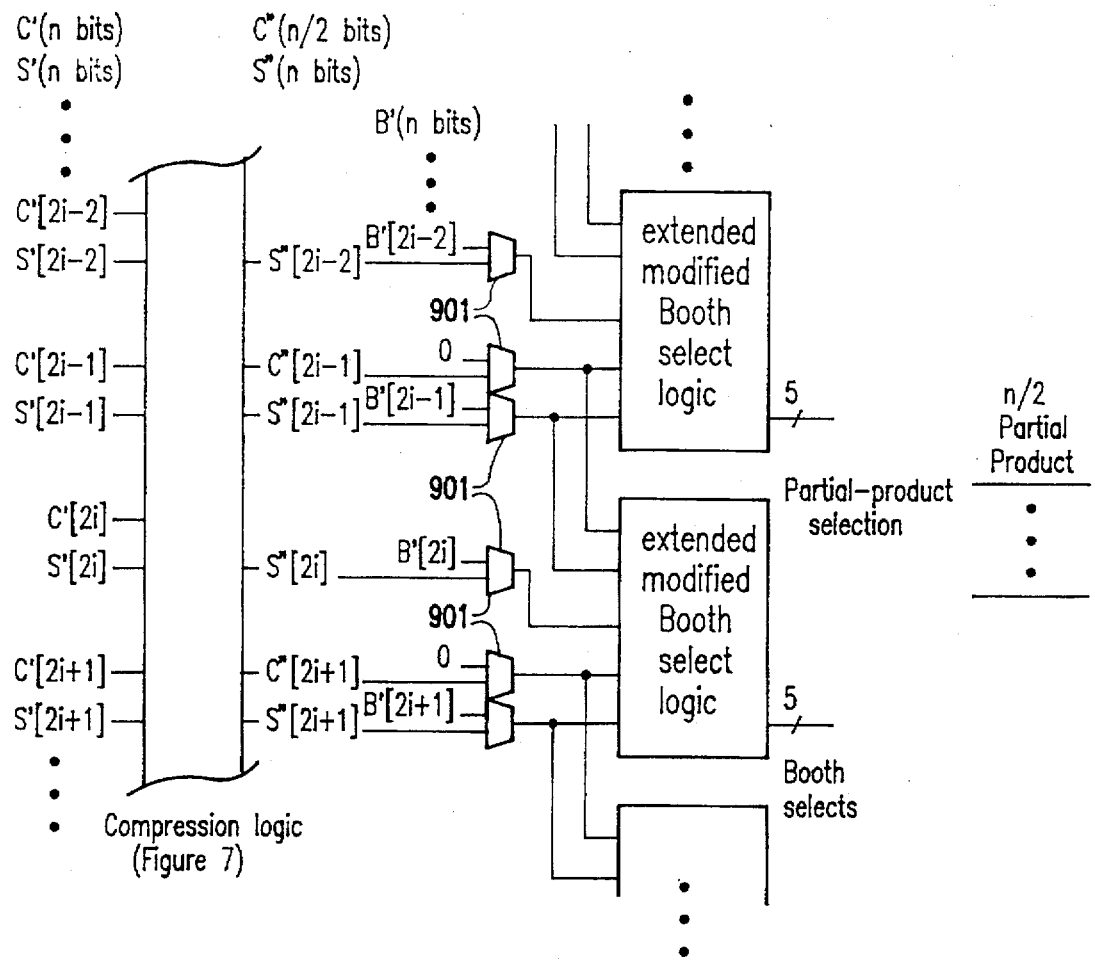
FIG. 9 is a block diagram of the generation of partial products for either binary times carry-save multiplication or binary times binary multiplication according to the invention.

A third embodiment of the invention shares not just the design of bitstack circuits for conventional binary multipliers, but the circuits themselves. FIG. 9 shows the implementation of partial-product generation for this embodiment. It is similar to FIG. 8 with a set of selectors 901 added prior to the Booth recoding logic, where one set of inputs to the selectors are the outputs of the additional compression logic and the other set are the bits of a new binary input B'.

The selection of either a single input B' or the sum C'+S' of a pair of inputs can be handled as follows:

To multiply A×(C'+S'), set C" and S" to be the output of the compression logic in FIG. 7.

Since the selection is made after the compression logic of FIG. 7, the delay for binary multiplication does not include the compression logic. The prior art performs the selection of raw carry-save or binary inputs, thus increasing the delay of binary multiplication by all the extra processing done on the carry-save inputs.

To multiply A×B', select S"[i]=B'[i] and C"[i]=0. P[i] now is between 0 and 3, and the extended modified Booth recoding in Table 2 gives the same set of Booth selects as the current art modified Booth recoding described above.

This third embodiment comprises hardware to perform either ordinary binary multiplication or the calculation of the recurrent Equation (8) in time approximately (R+1)log(n). This embodiment can use conventional bitstack circuits for binary multipliers, with the addition of:

- an additional sum input (Z) to the compression logic;
- means to feed back the product in carry-save form before the final addition;
- means for selecting either the feedback term or an initializing input;
- an additional compression level on the carry-save input;
- means for selecting either the compressed carry-save input or a binary input; and
- extensions to convention Booth recoding logic.

Current hardware designs for binary multipliers often include a select gate before Booth recoding to allow the input to come from one of several sources. The present invention adds one port to this selector, for S", and an n/2-bit selector with two ports, to choose between C" and 0. When the present invention is used for binary multiplication, therefore, the delay is only minimally greater than for prior art multipliers. The additional delay is due to adding one port to the selector already used for the B' input and the extension of the Booth recoding logic from that in Table 1 to that in Table 2.

The delay to compute the recurrent Equation (8) includes the additional compression in each iteration except the last and is approximately $$(R-1)(\log(n)+1)+2\log(n) = (R+1)\log(n)+R-1.$$

While the invention has been described in terms of preferred embodiments, those skilled in the art will recognize that the invention can be practiced with modification within the spirit and scope of the appended claims.

Having thus described our invention, what we claim as new and desire to secure by letters patent is as follows:

1. A recurrent calculator using carry-save arithmetic comprising:

a partial product generator for generating a plurality of partial products whose sum is a product A×B, where A is one binary input and B is a sum C'+S' of carry-save inputs C' and S', wherein the partial product generator has a compressor for compressing C' and S' to C" and S", where the sum of compressed values, C"+S", equals the sum of the binary inputs C'+S' and C"(i) is non-zero only for odd values of i, i being an integer and $0 \leq i \leq n-1$, n being the number of bits in B;

a compressor for compressing the plurality of partial products and an additional input Z to two partial products C and S whose sum C+S equals a sum of the plurality of partial products and Z;

a carry propagate adder for adding the partial products C and S to produce a binary result X equal to A×B+Z;

a feedback path for returning the partial products C and S from the compressor to the inputs C' and S' for a next iteration; and a selector for selecting whether inputs C' and S' are the partial products C and S from a previous iteration or initializing values C(0) and S(0) on an initial iteration.

2. The recurrent calculator using carry-save arithmetic as recited in claim 1 wherein the compressor that compresses C' and S' comprises an array of half adders followed by an array of full adders, receiving bit pairs for generating partial products, outputs of the half adder array being S"(2i−1) and an intermediate Carry used by the full adder array to generate S"(2i) and C"(2i−1) such that $$\sum_{i=1}^{n} 2^i C''(i) + \sum_{i=1}^{n} 2^i S''(i) = \sum_{i=1}^{n} 2^i C(i) + \sum_{i=1}^{n} 2^i S(i).$$

3. The recurrent calculator using carry-save arithmetic as recited in claim 2 wherein each pair of C" and S" are assigned values:

$$P(i) = 2 \times C''(2i+1) + 2 \times S''(2i+1) + S''(2i),$$

where values of P(i) are encoded by a table in which P(i−1)>1 is true when C"(2i−1)=1 or S"(2i−1)=1.

4. A recurrent calculator using carry-save arithmetic comprising:

a partial product generator for generating a plurality of partial products whose sum is a product A×B, where A is one binary input and B is a sum C'+S' of carry save inputs C' and S', the partial product generator comprising an array of half adders followed by an array of full adders, receiving bit pairs for generating partial products, outputs of the half adder array being S"(2i−1) and an intermediate Carry used by the full adder array to generate S"(2i) and C"(2i−1) such that $$\sum_{i=1}^{n} 2^i C''(i) + \sum_{i=1}^{n} 2^i S''(i) = \sum_{i=1}^{n} 2^i C(i) + \sum_{i=1}^{n} 2^i S(i), \text{ with } C''(2i) = 0,$$

i being an integer and $0 \leq i \leq n-1$, n being the number of bits in B;

a compressor array for compressing the plurality of partial products and an additional input Z to two partial products C and S whose sum C+S equals a sum of the plurality of partial products and Z;

a carry propagate adder for adding the partial products C and S to produce a binary result X equal to A×B+Z;

a feedback path for returning the partial products C and S from the compressor array to the inputs C' and S' for a next iteration; and a selector for selecting whether inputs C' and S' are the partial products C and S from a previous iteration or initializing values C(0) and S(0) on an initial iteration.

5. The recurrent calculator using carry-save arithmetic as recited in claim 4 wherein each pair of C" and S" are assigned a value:

$$P(i)=2\times C"(2i+1)+2\times S"(2i+1)+S"(2i),$$

where values of P(i) are encoded by a table in which P(i−1)>1 is true when C"(2i−1)=1 or S"(2i−1)=1.

* * * * *